US012568979B2

(12) United States Patent
Delius et al.

(10) Patent No.: US 12,568,979 B2
(45) Date of Patent: Mar. 10, 2026

(54) FOOD CASING WITH PERMEABILITY TO SMOKE AND WATER VAPOUR AND WITH IMPROVED TRANSPARENCY

(71) Applicant: Kalle GmbH, Wiesbaden (DE)

(72) Inventors: Ulrich Delius, Trittau (DE); Igor Raskita, Wiesbaden (DE)

(73) Assignee: Kalle GmbH, Wiesbaden (DE)

( * ) Notice: Subject to any disclaimer, the term of this patent is extended or adjusted under 35 U.S.C. 154(b) by 838 days.

(21) Appl. No.: 17/591,118

(22) Filed: Feb. 2, 2022

(65) Prior Publication Data

US 2022/0240522 A1      Aug. 4, 2022

(30) Foreign Application Priority Data

Feb. 3, 2021      (DE) ............................. 102021102502

(51) Int. Cl.
*A22C 13/00*            (2006.01)

(52) U.S. Cl.
CPC ...... *A22C 13/0013* (2013.01); *A22C 13/0003* (2013.01); *A22C 2013/002* (2013.01); *A22C 2013/005* (2013.01); *A22C 2013/0063* (2013.01)

(58) Field of Classification Search
CPC .......... C08L 77/06; C08L 77/02; C08L 39/06; C08L 71/02; A22C 13/0003; A22C 13/0013; A22C 2013/0063; A22C 2013/002; A22C 2013/0089; A22C 2013/005; C08K 5/053
USPC ........................................................ 426/105
See application file for complete search history.

(56) References Cited

U.S. PATENT DOCUMENTS

| | | | |
|---|---|---|---|
| 2004/0062889 A1 | 4/2004 | Borodaev et al. | |
| 2006/0188615 A1 | 8/2006 | Wilfer et al. | |
| 2006/0234611 A1 | 10/2006 | Delius et al. | |
| 2014/0322393 A1 | 10/2014 | Savic et al. | |

FOREIGN PATENT DOCUMENTS

| | | |
|---|---|---|
| DE | 103 02 960 A1 | 8/2004 |
| DE | 103 20 327 A1 | 12/2004 |
| DE | 10 2018 201 241 A1 | 8/2019 |
| EP | 1 380 212 A1 | 1/2004 |
| WO | 02/078455 A1 | 10/2002 |

OTHER PUBLICATIONS

European Search Report in corresponding EP 22 15 4936.

*Primary Examiner* — Subbalakshmi Prakash
(74) *Attorney, Agent, or Firm* — ProPat, LLC; Cathy R. Moore

(57)      ABSTRACT

The present invention relates to a tubular, seamless, biaxially stretched, smoke-permeable and water vapour-permeable, colouristically neutral and transparent, single-layer food casing formed from a mixture including 50 to 95% by weight of aliphatic (co)polyamide, 3 to 40% by weight of at least one vinyl (co)polymer having units of N-vinyl-2-pyrrolidone and 1.5 to 7.0% by weight of at least one aliphatic diol and/or aliphatic polyol, based in each case on the weight of the mixture. The diol and/or polyol is homogeneously distributed in a matrix formed by the aliphatic (co)polyamide. The food casing is produced by an extrusion method with biaxial tube stretching and subsequent heat-setting. It is particularly suitable as synthetic sausage casing, especially for raw sausage, such as salami or mettwurst.

28 Claims, No Drawings

FOOD CASING WITH PERMEABILITY TO SMOKE AND WATER VAPOUR AND WITH IMPROVED TRANSPARENCY

CROSS REFERENCE TO RELATED APPLICATIONS

This application claims priority to parent German Patent Application No. 10 2021 102 502.8, filed Feb. 3, 2021. German Patent Application No. 10 2021 102 502.8 is hereby incorporated herein in its entirety.

FIELD OF THE INVENTION

The invention relates to a casing based on plastic with high permeability for smoke and water vapour and also with improved transparency or light transmissibility relative to prior-art casings. The casing consists substantially of one or more aliphatic (co)polyamides, a vinylpyrrolidone (co)polymer and at least one aliphatic diol and/or aliphatic polyol.

BACKGROUND OF THE INVENTION

As alternatives to synthetic skins based on collagen and cellulose, casings composed of synthetic polymers have been described (for an overview, see, for example, B.-A. Lang, G. Effenberger, Wursthüllen-Kunstdarm [Sausage casings-synthetic skin], Deutscher Fachverlag GmbH, Frankfurt a. M., $3^{rd}$ edn. [2006], pp. 62-70).

These casings consist predominantly of thermoplastic materials having a low permeability to water vapour. These kinds of casings are widespread for the production of cooked sausage and scalded sausage. For dried raw sausage, such as salami, they are of course unsuitable.

In more recent times there have also been disclosures of plastics-based casings which are permeable to smoke and water vapour.

EP 1 380 212 A1 describes stretched tubular casings composed of a mixture of a copolyamide (PA6/66 85:15) and a crosslinked N-vinylpyrrolidone polymer ("PVPP"). The examples of that patent application vary the fraction of the PVPP in the mixture from 4 to 50% by weight. For the water vapour permeability, figures in the 1000 to ≤2000 $g/m^2$ 24 h range are reported, measured at 40° C. and 90% relative humidity. Also reported is the weight loss of meat emulsion within the casing after 15 days and after two months. The figures when using a cellulose fibre casing are reported as a comparative. The weight loss of the sausage in the cellulose fibre casing after 15 days was substantially higher than that for casings composed of copolyamide and PVPP.

WO 02/078455 A1 describes films for the smoking and/or drying of foods, consisting of a polyamide matrix with a finely dispersed hydrophilic component. The latter is, for example, a (co)polymer of N-vinylpyrrolidone, vinyl alcohol, or polyethylene glycol. In the polyamide matrix, the hydrophilic component is in the form of domains having a diameter of 0.1-3 μm in the plane of the film. The examples report biaxially stretched casings having water vapour permeabilities in the range from 211 to 509 $g/m^2$ 24 h, measured at 30° C. and 65% relative humidity. Stated as a comparative is a collagen casing ("Cutisin") having a permeability of 1200 $g/m^2$ 24 h under the same conditions.

DE 103 02 960 A1 claims a biaxially oriented, smoke-permeable casing which comprises aliphatic (co)polyamide and at least one water-soluble synthetic polymer and which has a water vapour permeability in the 40 to 200 $g/m^2$ d range. The water-soluble polymer is preferably a polyvinyl alcohol, a polyalkylene glycol, a vinylpyrrolidone (co)polymer, a polymer of N-vinylalkylamides or a (co)polymer having units of α,β-unsaturated carboxylic acids and/or α,β-unsaturated carboxamides. The examples state casings having water vapour permeabilities in the range from 81 to 110 $g/m^2$ d, measured at 23° C. and 85% relative humidity. The water vapour permeabilities stated in specifications identified above were measured under different ambient conditions and are not comparable with one another. In the above-stated EP 1 380 212 A1 and in the likewise above-stated WO 02/078455, the cellulose fibre casing or collagen casing, respectively, employed as a comparative shows that this latter casing is distinctly superior in terms of water vapour permeability to each of the polyamide-based casings claimed.

Subject matter of DE 103 20 327 A1 is a single-layer or multi-layer, smoke-permeable and water vapour-permeable, seamlessly tubular, biaxially stretched food casing having a natural appearance. It consists of a thermoplastic mixture which comprises at least one aliphatic (co)polyamide, at least one water-soluble polymer and also an organic and/or inorganic filler. The water-soluble polymer is preferably polyvinyl alcohol, polyvinylpyrrolidone or a polyalkylene glycol. The organic filler is preferably a polysaccharide or a derivative thereof, starch or a starch derivative, or an organic synthetic fibre or powder, preferably based on fluoropolymers, polysulfones, polyethersulfones, polyetherketones and/or polyimides, with the fibre length or particle size being 5 to 3000 μm. Preferred inorganic fillers are fibres, beads or powders made of glass, carbonates such as calcium carbonate, sulfates such as calcium sulfate, of silicates, diatomite, aluminium hydroxide, titanium dioxide or silicon dioxide, with a fibre length or particle size of 0.1 to 3000 μm.

DE 10 2018 201 241 A1 discloses an at least two-layer, smoke-permeable and water vapour-permeable, tubular, seamless food casing based on thermoplastic polymers. It comprises an inner layer composed of a blend of aliphatic or isocyclic (co)polyamide and a polyetheramide, polyetherester or polyetherurethane. At least one further layer consists of a blend of aliphatic (co)polyamide and at least one hydrophilic polymer, such as polyvinylpyrrolidone, polyvinyl alcohol or a polyalkylene glycol. The adhesion of the casing to the food can be tailored by modifying the mixing ratio of the components of the inner layer.

A general deficiency of the above-stated casings is their inadequate transparency or limited light transmissibility. The casings are based on a matrix of polyamide containing dispersed particles of a hydrophilic or water-soluble polymer (PVPP, (co)polymer of vinylpyrrolidone, copolymer of vinyl alcohol, etc.). PVPP is a crosslinked polyvinylpyrrolidone and is constitutionally unmeltable. The other polymers stated are unmeltable or are meltable only with limitations, or at least are not homogeneously miscible with polyamides. As a consequence of this, the hydrophilic or water-soluble polymers in the polyamide matrix of the casings take the form of dispersed particles or droplets (also referred to as domains). WO '455 specifies domains having a diameter of 0.1-3 μm.

The skilled person is aware that electromagnetic waves (visible light corresponds to the wavelength range from about 400 to 800 nm) are scattered at small spherical objects. In the case of solids with particles dispersed therein, light scattering occurs at the particle surfaces where the material of the particles has an optical density deviating from that of the matrix (different refractive index). This is always the case where there are significant chemical differences between particle material and matrix material, and hence also in the case of the above-stated casings.

Terms used in a complementary way to the concept of transparency include opacity, haze and opalescence.

Opacity is based on wavelength-independent light scattering. In this case the light is scattered in a wide angular range. Opacity occurs when the scattering particles are larger than the wavelength of the irradiated light (that is, in the case of light up to the boundary with the infrared [wavelength up to about 800 nm], greater than 0.8 μm). Opalescence is based on a wavelength-dependent scattering at low angles with respect to the axis of the incident light. Opalescence occurs when the scattering particles are somewhat smaller than the wavelength of the irradiated light (that is, in the case of light up to the boundary with the ultraviolet [wavelength from about 400 nm], less than 0.4 μm). Scattered light has a blueish appearance, whereas light passing directly through has a reddish appearance (see https://de.w-ikipedia.org/wiki/Opazit%C3%A4t).

Opacity in plastics is manifested optically in a uniform whitish haze. Opalescence, conversely, is manifested in a changing colour effect which is dependent on the viewing angle, and which is often also referred to as mother-of-pearl lustre. There is hardly any published data on the opalescence of films. The only optical quality criterion reported for films, if at all, is a measure of the opacity; in general, the easily measured haze according to standard ASTM D1003. That standard defines the haze as the percentage fraction of transmitted light having a large scattering angle; more precisely, as the detectable light fraction which deviates from the angle of the irradiated light by more than 2.5° [arc minutes]. Since any light-scattering particles contained within a film usually have a broad size distribution, they then give rise both to opalescence and to opacity or haze. Films having a very low measured haze may therefore be assumed also to possess low opalescence.

WO '455 specifies casings having domains (=dispersed, light-scattering particles) with a diameter of 0.1-3 μm. For the casings of EP 1 380 212 A1 and DE 103 02 960 A1, no particle or droplet diameters are disclosed. It may be assumed, however, that their diameters are predominantly above 0.4 μm and also, proportionally, below that figure. This is an explanation for the slightly milky perceived colour (haze) of all of these casings and of the mother-of-pearl lustre (opalescence) of at least some of them.

The user has an interest in sausage casings which give the consumer a natural impression of colour and texture of the sausage mass. Hazing or an opalescent colour effect in the casing is undesirable, as it gives the consumer an unnatural impression of the sausage product or raises the suspicion of a relatively low-grade product.

Summary of Advantageous Inventive Embodiments

The object, accordingly, was to provide a plastics casing which has very good permeability to smoke and water vapour and at the same time is highly transparent and colouristically neutral, thus having an extremely low opacity and low opalescence.

At the same time, the casing ought to meet the technical requirements in sausage production, such as burst resistance, cooking stability, dimensional integrity and emulsion adhesion.

The casing, furthermore, ought to be able to be produced inexpensively and easily by a thermoplastic route.

The object has been achieved with a single-layer film casing composed of a mixture comprising aliphatic (co)

polyamide and at least one vinyl (co)polymer having units of N-vinyl-2-pyrrolidone. It is characterized in that the fraction of the at least one aliphatic copolyamide is 50 to 95% by weight and the fraction of the at least one vinyl (co)polymer is 3 to 40% by weight, based in each case on the weight of the mixture, and in that the mixture further comprises 1.5 to 7.0% by weight of at least one aliphatic diol and/or aliphatic polyol, where the diol or polyol is homogeneously distributed in a matrix formed by the aliphatic (co)polyamide.

The casing of the invention preferably consists solely of the stated components, and so the individual weight fractions add up to 100% by weight.

Surprisingly it has been found that for thermoplastically produced casings composed of the above-stated components [with suitable prior compounding] there are no longer any discrete particles perceptible in the polyamide matrix and that the casings, correspondingly, are highly transparent and also colouristically neutral.

Surprisingly it has been found that the transparency of the casing decreases again if the fraction of the aliphatic diol and/or polyol exceeds 7.0% by weight, based on the weight of the casing.

DETAILED DESCRIPTION OF ADVANTAGEOUS INVENTIVE EMBODIMENTS

The food casing of the invention for a thickness of 25 to 30 μm has a light transmissibility [total transmittance $\tau_t$] in the wavelength range from 380 to 780 nm of at least 80%, preferably at least 85%, more preferably at least 90%, more particularly at least 92%, especially at least 94%, determined according to DIN EN ISO 13468-2:2006 with a spectrophotometer.

The food casing of the invention for a thickness of 25 to 30 μm has, generally, a total haze of less than 15%, preferably less than 10%, determined according to ASTM D 1003-13, Procedure A (measurement without oil immersion).

The total transmittance is measured according to DIN EN ISO 13468-2:2006 with a spectrophotometer having a stabilized light source, a monochromator, a measuring beam and a reference beam (→two-beam instrument), an integrating sphere (Ulbricht sphere) and a photodetector.

During the measurement the ratio $\xi(\lambda)$ of the photodetector signals $I_{sam}(\lambda)$ (sample) to $I_{ref}(\lambda)$ (reference beam) for the set wavelength $\lambda$ is indicated:

$$\xi(\lambda)=I_{sam}(\lambda)/I_{ref}(\lambda)$$

The following readings are taken:
$\xi_1(\lambda)$ without sample over the entrance port of the integrating sphere
$\xi_2(\lambda)$ with sample over the entrance port of the integrating sphere The readings are taken for the 380 nm to 780 nm spectral range in steps of 5 nm. For each wavelength, the total spectral transmittance $\tau_1(\lambda)$ is given by:

$$\tau_1(\lambda)=\xi_2(\lambda)/\xi_1(\lambda) \qquad \text{(formula 1)}$$

The total transmittance for the entire wavelength range $\tau_t$ in % is computed as follows:

$$\tau t = \frac{\Sigma_{\lambda=380\ nm}^{780\ nm}\tau(\lambda)\cdot S(\lambda)\cdot V(\lambda)}{\Sigma_{\lambda=380\ nm}^{780\ nm}S(\lambda)\cdot V(\lambda)}[\%] \qquad \text{(formula 2)}$$

where:

τ(λ) is the measured total spectral transmittance from formula 1

S(λ) is the radiation function (relative spectral energy distribution of the CIE standard illuminant D65)

V(λ) is the spectral luminous efficiency (corresponding to the spectral function $\bar{y}(\lambda)$ for standard observers according to CIE 1931)

The term "(co)polyamide" is used in connection with the present invention as an abbreviated designation for "Poly-imide and/or copolyimide". The term "copolyimide" here also includes polyamides having three or more different monomer units. Preferred among the aliphatic (co)poly-amides are poly(ε-caprolactam), also referred to as PA 6, copolyamides of ε-caprolactam and ω-laurolactam (=PA 6/12), copolyamides of ε-caprolactam, hexamethylenedi-amine and adipic acid (=PA6/66) and also copolyamides of ε-caprolactam, 3-aminomethyl-3,5,5-trimethylcyclohex-ylamine (isophoronediamine) and isophthalic acid. The copolyamides are also reckoned to include heterofunctional polyamides, more particularly polyetheramides, polyester-amides, polyetheresteramides and polyamidurethanes. Of these polymers, preference is given to those with a block-like distribution of the various functionalities, i.e. block copolymers. Particularly preferred block copolymers are poly(ether-block-amides).

The fraction of the aliphatic (co)polyamide is generally 50 to 95% by weight, preferably 60 to 85% by weight, more preferably 70 to 80% by weight, based in each case on the total weight of the mixture.

The term "vinyl (co)polymer having vinylpyrrolidone units" is used in connection with the present invention as an abbreviated designation for homopolymers or copolymers which are formed by polymerization of α,β-unsaturated aliphatic monomers wherein one monomer unit is always N-vinyl-2-pyrrolidone. Preference here is given to a) polyvinylpyrrolidone (homopolymer of N-vinyl-2-pyr-rolidone)

b) copolymers of N-vinyl-2-pyrrolidone and one or more vinyl esters, especially vinyl acetate c) copolymers of N-vinyl-2-pyrrolidone and one or more esters or amides of α,β-unsaturated carboxylic acids, especially methyl acrylate and acrylamide d) copolymers of N-vinyl-2-pyrrolidone and N-vinylimi-dazole Particularly preferred among these groups are a) and d).

The fraction of this or these component(s) in the mixture is generally 3 to 40% by weight, preferably 8 to 25% by weight, more preferably 10 to 20% by weight. The term "diol" represents an aliphatic compound having two free hydroxyl groups, examples being ethylene glycol, 1,2-pro-panediol, 1,4-butanediol, diethylene glycol, polyethylene glycol, poly(1,2-propanediol) (=polypropylene glycol) and copolymers of ethylene glycol and 1,2-propanediol or of ethylene glycol and 1,4-butanediol. Preferred among these are polyethylene glycol and also copolymers of ethylene glycol and 1,2-propanediol.

The term "polyol" represents an aliphatic compound having three or more free hydroxyl groups, examples being glycerol, diglycerol, 1,1,1-trimethylolpropane, 2,2-bishy-droxymethyl-1,3-propanediol (pentaerythritol), and also sugar alcohols such as erythritol, sorbitol and mannitol. Preferred among these is glycerol. General preference is given to diols and polyols having 2 to 20 carbon atoms, more particularly those having 2 to 12 carbon atoms. The fraction of the at least one diol and/or polyol is generally 1.5 to 7.0% by weight, preferably 1.6 to 6% by weight, more preferably 1.7 to 5.5% by weight, based in each case on the total weight of the mixture.

In the mixture there may also, optionally, be relatively small fractions of further polymers, examples being semi-aromatic (co)polyamides and (co)polymers composed of or having units of α,β-unsaturated carboxylic acids or α,β-unsaturated carboxamides, more particularly having units of (meth)acrylic acid and/or (meth)acrylamide.

The fraction of optional further polymers in the mixture is generally 0 to 20% by weight, preferably 1 to 15% by weight, more preferably 2 to 10% by weight, based on the total weight of the thermoplastic mixture.

The mixture optionally further comprises additives which are soluble, liquid or solid at room temperature and which further influence the properties of the casing. In this way it is possible to tailor, for example, the blocking tendency, the tactile qualities, the moisture storage capacity or the peeling behaviour. Examples of additives contemplated include polysaccharides and finely divided inorganic fillers, more particularly antiblocking pigments and colour pigments, and also plastifying and compounding auxiliaries such as mono-, di- and triesters of glycerol with carboxylic acids, forma-mide, acetamide, N,N-dimethylformamide, N,N-dimethyl-acetamide, and also customary plastics stabilizers.

The fraction of any other additives present is generally 0 to 10% by weight, preferably 0.5 to 8% by weight, more preferably 1 to 5% by weight, based on the total weight of the mixture.

Another subject of the invention is a method for produc-ing the food casing of the invention. Production takes place generally by extrusion methods, which are known per se to the skilled person.

First of all the mixture for extrusion is produced by melt compounding in an apparatus suitable for this purpose, preferably in a twin-screw extruder with attached pelletizing die, air cooling section and pelletizer. The pellets obtained in this way are melted again in a further extruder and then processed to give a tubular casing.

After the melting in the further extruder, the mixture is again homogenized and plastified. The melt is then extruded through an annular die. This forms a primary tube having a relatively high wall thickness. The primary tube is then rapidly cooled in order to "freeze in" the amorphous state of the polymers. It is thereafter then heated again to the temperature required for stretching, for example to about 80° C. The tube is then stretched in longitudinal and transverse directions, preferably carried out in one opera-tion. The longitudinal stretching is typically performed by means of two pairs of squeeze rolls, with increasing drive speed; the transverse stretching is accomplished by a gas pressure which acts from inside on the walls of the tube. The area stretch ratio (being the product of longitudinal stretch ratio and transverse stretch ratio) is generally about 6 to 18, preferably about 8 to 11.

After stretching has taken place, the tube is preferably also heat-set. This allows the desired shrinkage properties to be established with precision. The heat-setting leaves a residual shrinkage of generally less than 20% in longitudinal and transverse directions, measured on a sample immersed in water of 90° C. for 1 min. Finally, the tube is cooled, collapsed to a flat state and wound up.

In one particular embodiment, the tube is subsequently wreathed. For this purpose the tube is inflated, heated on one side (generally without contact, by radiant heat) and then curved in the heated state, so that it takes on a ring or spiral shape. Methods and apparatus for wreathing are common knowledge to the skilled person and are also described in the patent literature.

EXAMPLES

The examples below serve for illustration, but have no limiting character on the scope of the invention. Percentages are weight percentages, unless indicated otherwise or apparent from the context.

Starting Materials Used were as Follows:

Aliphatic Polyamides (PA):

PA1: polyamide 6/66 having a relative viscosity of 3.4 (measured in 96% sulfuric acid) and a crystallite melting temperature of 192° C. (measured by DSC)

PA2: copolyamide of ε-caprolactam, 3-aminomethyl-3,5, 5-trimethylcyclohexylamine (isophoronediamine) and isophthalic acid, having a melt volume flow rate (MVR) of 5 cm$^3$/10 min (measured at 235° C. under a load of 2.16 kg) and a crystallite melting point of 212° C.

Vinyl (co)polymers having vinylpyrrolidone units (vinylpyrrolidone (co)polymers):

VP1: polyvinylpyrrolidone having a K value of 25 and an average molecular weight $M_w$ of 34 000 daltons VP2 copolymer of N-vinyl-2-pyrrolidone and vinyl acetate (ratio 60:40) having a K value of 30-50 and a molecular weight $M_w$ of 51 000 daltons Prior-Art Water-Soluble Polymer:

WP1 polyvinyl alcohol having a molecular weight $M_w$ of 11 000 Da and a degree of hydrolysis of 88%

Diol or polyol:

Diol polyethylene glycol (PEG) having an average molar mass of 400

Polyol glycerol 96%, purity according to DAB (German pharmacopeia)

Parameters Used in Characterizing the Casings

Haze measured according to ASTM D 1003 with a hazemeter in the wavelength range 400-700 nm (without oil immersion 4 total haze) (Byk-Gardner, model HAZE-GARD® PLUS)

$\tau_t$=total luminous transmittance, measured according to DIN EN ISO 13468-2:2006 on films 26 to 30 μm thick in the wavelength range 380 to 780 nm with a spectrophotometer with integrating sphere attachment 150 nm (Agilent, model CARY® 5000)

WTR=water vapour permeability, measured according to DIN 53122 with single-sided exposure of samples to air of 85% relative humidity and at 23° C. [g/m$^2$·d]

Examples 1 to 5: Production of Compounds Composed of Aliphatic Copolyamide, Vinylpyrrolidone (Co)Polymer and Diol or Polyol (Inventive)

A twin-screw extruder (manufacturer: Coperion, screw diameter: 25 mm) with single-hole exit die was charged sequentially via three discrete metering apparatuses with the components listed in table 1. The ratio of the metering rates [mass per unit time] to one another corresponded to the percentage values indicated in the table. The extruder was conditioned to 180° C. at the polyamide feed point. In the subsequent barrel zones, the temperature conditioning was raised gradually to a maximum of 230° C. The screw speed was about 200 rpm. In this way the polyamide was melted and plastified to form a homogeneous mixture with the pulverulent vinylpyrrolidone (co)polymer and also the diol or polyol. The mixture emerged from the extruder via the pelletizing die, as a water-clear, uniform extrudate. For cooling, the extrudate was passed through a water bath and then comminuted into granular pellets by means of a strand pelletizer. The pellets were dried in a forced-air drier at about 100° C.

TABLE 1

Components of the Compounds in Examples 1 to 5

| Example | Aliphatic polyamide | Vinylpyrrolidone (co)polymer | Diol or polyol |
|---|---|---|---|
| 1 | PA1 77.3% by weight | VP1 21% by weight | Diol 1.7% by weight |
| 2 | PA2 77.3% by weight | VP1 21% by weight | Diol 1.7% by weight |
| 3 | PA1 73.8% by weight | VP1 21% by weight | Polyol 5.2% by weight |
| 4 | PA1 77.3% by weight | VP2 21% by weight | Diol 1.7% by weight |
| 5 | PA1 75.5% by weight | VP2 21% by weight | Polyol 2.7% by weight |

Comparative Example C1: Replication of WO02/078455 A1, Example 1 (Closest Prior Art)

Initial Remarks

Example 3 of WO '455 states that a mixture of the components PA6.66 [=PA6/66] (90% by weight, ULTRA-MID® C35, BASF) [the figure stated was "94% by weight"—this is evidently a typographical error] and polyvinylpyrrolidone (10% by weight, "POVIDEN®" [grade not specified], BASF) was introduced into an extruder and melted. The melt is said then (directly) to be extruded through an annular die and shaped to form a primary tube. Not set out are the type of extruder used and the manner in which said components were supplied to the extruder. In the extrusion technology field, mixtures are commonly understood to be "dryblends", produced by simple mechanical premixing of the components at room temperature. Dryblends can be supplied to an extruder in general by a simple method, as by means of a mounted hopper, for example.

Accordingly, first 90% by weight of pellet-form PA1 [PA6/66] and 10% by weight of pulverulent VP1 [polyvinylpyrrolidone] were placed into a mixing drum, where they underwent intense circulation for around 30 minutes. The resulting powder-pellet mixture was supplied via a customary feed hopper to a single-screw extruder, which was conditioned to a temperature profile rising from 160° C. to 235° C. It was immediately apparent that the mixture was not taken up uniformly and in the specified proportions by the extruder. The polyvinylpyrrolidone particles underwent settling through between the substantially larger PA6/66 granular pellets, and so the fraction of polyvinylpyrrolidone in the extruder to start with was substantially higher than the mixture proportion. As a result of the absorption of ambient moisture by the hygroscopic polyvinylpyrrolidone particles, moreover, there was agglomeration and sticking of powder particles on the base of the hopper and, ultimately, the extruder opening became clogged. It was necessary to switch to the compounding of the components by means of a twin-screw extruder, which provides for separate feeding and metering of the components.

Comparative Example C1a Replication of WO 02/078455 A1, Example 1 (Amended Method)

90% by weight of PA1 [pellet-form PA6/66] and 10% by weight of VP1 [pulverulent polyvinylpyrrolidone] were compounded by means of a twin-screw extruder under the same conditions as described for examples 1 to 5. In contrast to those examples, the material emerging from the pelletizing die of the extruder this time was a markedly hazy extrudate.

Comparative Example C2: Production of a Compound as in Examples 1 to 5, without Addition of Diol or Polyol A further compound was produced from 89% by weight of PA1 and 21% by weight of VP1, under the same conditions as described for examples 1 to 5.

Comparative Example C3: Replication of DE 103 02 960 A1, Example 1 (Closest Prior Art)

In a stirred tank with liquid jacket heating and close-clearance stirrer, 75% by weight of WP1 were introduced at room temperature. With stirring at around 1000/min, first 15% by weight of diol and then 7.5% by weight of polyol and also 2.5% by weight of water were added. The contents of the tank were heated to 100 to 110° C., stirred at this temperature for 15 min, and cooled again with further stirring to 30 to 40° C. A metering apparatus was used to meter the resultant powder into a heated twin-screw extruder (properties as described under examples 1 to 5). The screw speed was 250/min, and the heaters were set to temperatures of 120° C. (feed point) downstream rising to 180° C. (die). The emerging extrudate was cooled on an air cooling section and then comminuted into granular pellets using a strand pelletizer.

Comparative Examples C4 to C9: Production of Compounds as in Example 1, with Additions of Diol and/or Polyol of Below 1.5 and, Respectively, Above 7.0% by Weight (not Inventive)

Further compounds were produced from the components set out in table 2, using a twin-screw extruder, under the same conditions as described for examples 1 to 5.

TABLE 2

| | | Components of the compounds of examples C4 to C9 | | |
|---|---|---|---|---|
| Example No. | Aliphatic polyamide | Vinylpyrrolidone (co)polymer | Diol | Polyol |
| C4 | PA1 78.0% by weight | VP1 21% by weight | 1.0% by weight | — |
| C5 | PA1 71.0% by weight | VP1 21% by weight | 8.0% by weight | — |
| C6 | PA1 71.0% by weight | VP1 21% by weight | — | 8.0% by weight |
| C7 | PA1 71.0% by weight | VP1 21% by weight | 2.8% by weight | 5.2% by weight |
| C8 | PA1 69.0% by weight | VP1 21% by weight | 3.5% by weight | 6.5% by weight |
| C9 | PA1 67.5% by weight | VP1 21% by weight | 4.5% by weight | 7.0% by weight |

Examples 6 to 10 Production of Biaxially Stretched Tube Casings

The pellets obtained according to examples 1 to 5 were supplied (without further additions) via a feed hopper to the single-screw extruder of a standard commercial extrusion and tube stretching unit (double-bubble unit with mono-annular die). In the extruder the pellets were melted and the melt was plastified and conveyed in the direction of the die. In the die the melt flow was pressed axially through distribution channels which opened out in an annular gap. The melt film emerging from the gap was shaped by means of a calibrator into a primary tube 13 mm in diameter and at the same time was cooled to room temperature. The primary tube was then heated to around 80° C. again and stretched in transverse and longitudinal directions by means of an inserted air cushion. The stretch ratios were about 3.30 in transverse direction and about 1.95 in longitudinal direction. The stretched tube was passed through squeeze rolls, then subjected to a second air cushion and passed through a setting tunnel equipped with IR lamps. The tube here reached a surface temperature of around 150° C. Finally, the tube was squeezed off again, cooled in the collapsed state, and wound up. The resulting casing had a diameter of 43 mm and a film thickness in the 26 to 30 μm range.

The test results for the casings are set out in table 3.

TABLE 3

| | | Data of the inventive casings | | | |
|---|---|---|---|---|---|
| Example No. | Pellets used for production | Film thickness (averaged over periphery) [μm] | WTR [g/m² d] | Haze [%] | $\tau_r$ [%] |
| 6 | as in example 1 | 26 | 320 | 8.2 | 87.6 |
| 7 | as in example 2 | 30 | 370 | 7.0 | 92.1 |
| 8 | as in example 3 | 28 | 360 | 2.9 | 94.5 |
| 9 | as in example 4 | 29 | 260 | 9.1 | 85.0 |
| 10 | as in example 5 | 28 | 280 | 9.4 | 82.7 |

Comparative Example C10: Casing as in WO 02/078455 A1, Example 3 (Amended Production Method)

The pellets obtained as in example C1a were supplied (without further additions) to the extruder of the extrusion and tube stretching unit described in examples 6 to 10, and were processed under the same conditions to give a biaxially stretched casing.

Comparative Example C11: Casing Analogous to Examples 6 and 8, without Diol or Polyol The compound produced as in example C2 was supplied (without further additions) to the extruder of the extrusion and tube stretching unit described in examples 6 to 10, and was processed under the same conditions to give a biaxially stretched casing.

Comparative Example C12: Casing as Per DE 103
02 960 A1, Example 2

The pellets of example C3 were premixed with pellet-form PA1 in a ratio of 30 to 70 parts by weight. The mixture was supplied to the extruder described in examples 6 to 10, plastified therein to form a homogeneous melt, and processed under the stated conditions likewise to give a biaxially stretched tube casing.

Comparative Examples C13 to C18: Casings
Analogous to Examples 6 and 8, with Fractions of
Diol and/or Polyol of Less than 1.5 or More than
7.0% by Weight The pellets of examples C4 to C9 were supplied (without further additions) to the extruder of the extrusion and tube stretching unit described in examples 6 to 10, and were processed under the same conditions to give biaxially stretched casings.

TABLE 4

| | | Data of the casings from comparative examples C10 to C18 | | | |
| --- | --- | --- | --- | --- | --- |
| Example No. | Pellets used for production | Film thickness (averaged over periphery) [μm] | WTR [g/m² d] | Total haze [%] | $\tau_t$ [%] |
| C10 | as in example C1a | 26 | 170 | 16.3 | 76.4 |
| C11 | as in example C2 | 27 | 310 | 18.1 | 73.1 |
| C12 | 30% by weight as in example C3 70% by weight PA1 | 25 | 90 | 28.5 | 47.5 |
| C13 | as in example C4 | 26 | 310 | 11.8 | 78.0 |
| C14 | as in example C5 | 24 | 330 | 14.5 | 79.8 |
| C15 | as in example C6 | 25 | 370 | 13.2 | 78.3 |
| C16 | as in example C7 | 26 | 340 | 13.8 | 77.5 |
| C17 | as in example C8 | 24 | 370 | 17.6 | 72.1 |
| C18 | as in example C9 | 25 | 380 | 22.1 | 61.4 |

Relative to the casings according to inventive Examples 6 to 10, the casings of Comparative examples C10 to C12 showed significantly higher values for haze and lower values for transmittance. This demonstrates the superiority of the casings of the invention in terms of transparency (and hence also low opalescence) relative to the prior art. The comparison of the haze values and of the transmittance values of the casing of comparative example C11 with those of inventive Examples 6 and 8 (all three of which contained the same copolyamide and a 21% by weight fraction of PVP) directly showed the haze-reducing effect of the diol or polyol in the casing of the invention. Examples C13 to C18 show that fractions of diol and/or polyol outside the range from 1.5% by weight to 7.0% by weight lead again to a significant increase in the haze value and to a drop in the transparency value relative to the casings of the invention.

That which is claimed:

1. A tubular, seamless, biaxially stretched, smoke-permeable and water vapour-permeable, coloristically neutral and transparent, single-layer food casing composed of a mixture comprising at least one aliphatic (co) polyamide and at least one vinyl (co) polymer having units of N-vinyl-2-pyrrolidone, wherein the at least one aliphatic (co) polyamide is present at a fraction of 50 to 95% by weight and the at least one vinyl (co) polymer is present at a fraction of 3 to 40% by weight, based in each case on the weight of the mixture, and the mixture further comprises 1.5 to 7.0% by weight, based on the mixture weight, of at least one aliphatic diol and/or aliphatic polyol, where the diol or polyol is homogeneously distributed in a matrix of the aliphatic (co) polyamide, the food casing has a total luminous transmittance of at least 80%, determined on a casing having a thickness of 25 to 30 μm in the wavelength range from 380 to 780 nm with a spectrophotometer, the food casing has a total haze of less than 10%, determined according to ASTM D 1003-6113, procedure A, without oil immersion, and the food casing does not comprise discrete domains.

2. The food casing according to claim 1, wherein the aliphatic (co) polyamide is (i) poly(ε-caprolactam) (PA6), (ii) a copolyamide of ε-caprolactam and ω-laurolactam (PA 6/12), (iii) a copolyamide of ε-caprolactam, hexamethylenediamine and adipic acid (PA6/66) or (iv) a copolyamide of ε-caprolactam, 3-amino-3,5,5-trimethylcyclohexylamine (isophoronediamine) and isophthalic acid.

3. The food casing according to claim 1, wherein the fraction of the aliphatic (co) polyamide is 60 to 85% by weight, based on the weight of the mixture.

4. The food casing according to claim 3, wherein the fraction of the aliphatic (co) polyamide is 70 to 80% by weight, based on the weight of the mixture.

5. The food casing according to claim 1, wherein the aliphatic diol is ethylene glycol, propane-1,2-diol, butane-1,4-diol, diethylene glycol, polyethylene glycol, polypropylene glycol (poly(propane-1,2-diol)), copolymer of ethylene glycol and propane-1,2-diol, copolymer of ethylene glycol and butane-1,4-diol, or a mixture of two or more of the foregoing compounds.

6. The food casing according to claim 5, wherein the polyethylene glycol has up to 20 ethylene glycol units.

7. The food casing according to claim 1, wherein the aliphatic polyol is a compound having three or more free hydroxyl groups.

8. The food casing according to claim 7, wherein the compound contains not more than 20 carbon atoms.

9. The food casing according to claim 7, wherein the compound is glycerol, diglycerol, 1,1,1-trimethylolpropane, 2,2-bis-hydroxymethylpropane-1,3-diol (=pentaerythritol) or a sugar alcohol selected from erythritol, sorbitol or mannitol.

10. The food casing according to claim 1, wherein the fraction of the diol and/or polyol is 1.6 to 6.0% by weight, based on the weight of the mixture.

11. The food casing according to claim 10, wherein the fraction of the diol and/or polyol is 1.7 to 5.5% by weight, based on the weight of the mixture.

12. The food casing according to claim 1, wherein the at least one vinyl (co) polymer having units of N-vinyl-2-pyrrolidone is polyvinylpyrrolidone, a copolymer composed of or having units of N-vinyl-2-pyrrolidone and one or more vinyl esters, a copolymer composed of or having units of N-vinyl-2-pyrrolidone and one or more esters or amides of α,β-unsaturated carboxylic acids, or a copolymer composed of units of N-vinyl-2-pyrrolidone and N-vinylimidazole.

13. The food casing according to claim 12, wherein the copolymer composed of or having units of N-vinyl-2-pyrrolidone and one or more vinyl esters is vinyl acetate, and the copolymer composed of or having units of N-vinyl-2-pyrrolidone and one or more esters or amides of α,β-unsaturated carboxylic acids comprises methyl ester as the ester and acrylamide as the amide.

14. The food casing according to claim 1, wherein the fraction of the vinyl (co) polymer having units of N-vinylpyrrolidone is 8 to 25% by weight.

15. The food casing according to claim 14, wherein the fraction of the vinyl (co) polymer having units of N-vinylpyrrolidone is 10 to 20% by weight.

16. The food casing according to claim 1, wherein the food casing is partially heat-set and exhibits a residual shrinkage of less than 20% in longitudinal and transverse directions, measured after immersion and storage of the food casing for one minute in water having a temperature of 90° C.

17. The food casing according to claim 1, wherein the food casing has a wall thickness of 10 to 50 µm.

18. The food casing according to claim 17, wherein the food casing has a wall thickness of 15 to 40 µm.

19. The food casing according to claim 1, wherein the food casing has a diameter of 12 to 60 mm.

20. The food casing according to claim 19, wherein the food casing has a diameter of 15 to 50 mm.

21. The food casing according to claim 1, wherein the food casing has a water vapour permeability of 200 to 500

14 g/m² d, determined based on single-sided exposure of a sample of the food casing to air of 85% relative humidity at a temperature of 23° C.

22. The food casing according to claim 21, wherein the food casing has a water vapour permeability of 250 to 400 g/m² d, determined based on single-sided exposure of the sample of the food casing to air of 85% relative humidity at the temperature of 23° C.

23. The food casing according to claim 1, wherein the total luminous transmittance of the food casing is at least 85%, determined on the casing having a thickness of 25 to 30 µm in the wavelength range from 380 to 780 nm for the spectrophotometer.

24. The food casing according to claim 1, wherein the total luminous transmittance of the food casing is at least 90%, determined on the casing having a thickness of 25 to 30 µm in the wavelength range from 380 to 780 nm for the spectrophotometer.

25. A method for producing a food casing according to claim 1 comprising melt compounding the mixture of the aliphatic (co) polyamide, the at least one vinyl (co) polymer having units of N-vinyl-2-pyrrolidone and the at least one aliphatic diol and/or aliphatic polyol to convert the mixture into a homogeneous melt, extruding the homogeneous melt and processing the extrudate into pellets, remelting the pellets and extruding the remelted pellet to produce a primary tube having a relatively high wall thickness, cooling the primary tube rapidly to obtain polymers in an amorphous, heating the cooled primary tube to a temperature necessary for biaxial stretching, and stretching the heated primary tube in longitudinal and transverse directions by a gas pressure acting from inside, where the stretching is an area stretch ratio in the range from 1:6 to 1:12.

26. The method for producing the food casing according to claim 25, wherein the area stretch ratio is in the range from 1:8 to 1:10.

27. A raw sausage comprising a food casing as claimed in claim 1.

28. The raw sausage according to claim 27, wherein the raw sausage is a smoked raw sausage.

* * * * *